(12) United States Patent
Fukumori

(10) Patent No.: US 9,919,764 B2
(45) Date of Patent: Mar. 20, 2018

(54) BICYCLE SPROCKET

(71) Applicant: Shimano Inc., Sakai, Osaka (JP)

(72) Inventor: Tsuyoshi Fukumori, Osaka (JP)

(73) Assignee: Shimano Inc., Osaka (JP)

( * ) Notice: Subject to any disclaimer, the term of this patent is extended or adjusted under 35 U.S.C. 154(b) by 217 days.

(21) Appl. No.: 14/597,516

(22) Filed: Jan. 15, 2015

(65) Prior Publication Data

US 2016/0207590 A1 Jul. 21, 2016

(51) Int. Cl.
*F16H 55/12* (2006.01)
*F16H 55/30* (2006.01)
*B62M 9/10* (2006.01)

(52) U.S. Cl.
CPC ............ *B62M 9/10* (2013.01); *F16H 55/30* (2013.01)

(58) Field of Classification Search
CPC .......... B62M 9/10; B62M 9/105; B62M 9/12; F16H 55/30; F16H 55/08
USPC ........................................................ 474/160
See application file for complete search history.

(56) References Cited

U.S. PATENT DOCUMENTS

| | | | | |
|---|---|---|---|---|
| 5,078,653 A * | 1/1992 | Nagano | .................... | B62M 9/10 474/160 |
| 5,192,249 A * | 3/1993 | Nagano | .................... | B62M 9/10 474/160 |
| 5,413,534 A * | 5/1995 | Nagano | .................. | B62M 9/105 474/160 |
| 5,458,543 A * | 10/1995 | Kobayashi | ............... | B62M 9/10 474/160 |
| 5,464,373 A * | 11/1995 | Leng | ...................... | B62M 9/105 474/140 |
| 5,738,603 A * | 4/1998 | Schmidt | ................... | B62M 9/10 474/158 |
| 5,876,296 A * | 3/1999 | Hsu | .......................... | B62M 9/10 474/140 |
| 5,971,878 A * | 10/1999 | Leng | ...................... | F16H 55/30 474/160 |
| 6,007,442 A * | 12/1999 | Schmidt | .................. | B62M 9/10 474/122 |
| 6,572,500 B2 * | 6/2003 | Tetsuka | ..................... | B62M 9/10 474/160 |
| 8,092,329 B2 * | 1/2012 | Wickliffe | ............... | B62M 9/105 474/160 |
| 8,235,850 B2 * | 8/2012 | Lin | ........................ | B62M 9/105 474/160 |

(Continued)

FOREIGN PATENT DOCUMENTS

CN 103723237 A 4/2014

*Primary Examiner* — Henry Y Liu
(74) *Attorney, Agent, or Firm* — Global IP Counselors, LLP

(57) ABSTRACT

A bicycle sprocket includes a sprocket body and a chain engagement structure. The sprocket body has a center rotational axis, a first side surface and a second side surface. The first and second side surfaces face oppositely with respect to an axial direction of the bicycle sprocket. The first side surface is a smaller sprocket facing side of the bicycle sprocket. The chain engagement structure includes a plurality of sprocket teeth extending radially outward from an outer periphery of the sprocket body. The sprocket teeth include at least one shift assist tooth having a recessed portion recessed from the first side surface toward the second side surface. A protuberance is formed in the recessed portion.

15 Claims, 10 Drawing Sheets

(56) References Cited

U.S. PATENT DOCUMENTS

| | | | | |
|---|---|---|---|---|
| 8,550,944 | B2* | 10/2013 | Esquibel | B62M 9/10 474/160 |
| 8,617,015 | B2* | 12/2013 | Wickliffe | B62M 9/10 474/140 |
| 8,821,329 | B2* | 9/2014 | Wickliffe | B62M 9/105 474/140 |
| 2002/0006842 | A1* | 1/2002 | Tetsuka | B62M 9/10 474/160 |
| 2002/0086753 | A1* | 7/2002 | Yahata | B62M 9/105 474/160 |
| 2005/0079940 | A1* | 4/2005 | Reiter | F16H 55/30 474/160 |
| 2006/0258498 | A1* | 11/2006 | Tabe | B62M 9/105 474/160 |
| 2007/0060428 | A1* | 3/2007 | Meggiolan | B62M 9/10 474/160 |
| 2009/0082147 | A1* | 3/2009 | Braedt | B62M 9/10 474/160 |
| 2009/0098966 | A1* | 4/2009 | Kamada | B62M 9/10 474/160 |
| 2009/0258740 | A1* | 10/2009 | Valle | B62M 9/10 474/160 |
| 2010/0081531 | A1* | 4/2010 | Esquibel | B62M 9/10 474/160 |
| 2011/0092327 | A1* | 4/2011 | Oishi | B62M 9/10 474/160 |

* cited by examiner

BICYCLE SPROCKET

BACKGROUND

Field of the Invention

This invention generally relates to a bicycle sprocket. More specifically, the present invention relates to a bicycle sprocket having a protuberance formed in a recessed portion to facilitate engaging a chain with the sprocket.

Background Information

Bicycling is becoming an increasingly more popular form of recreation, as well as a means of transportation. Moreover, bicycling has become a very popular competitive sport for both amateurs and professionals. Whether the bicycle is used for recreation, transportation or competition, the bicycle industry is constantly improving the various components of the bicycle. One area that has been extensively redesigned over the years is the bicycle drive train. Specifically, manufacturers of bicycle components have been continually improving shifting performance of the various shifting components, such as shifters, derailleurs, chain and sprockets.

One particular component of the bicycle drive train that has been extensively redesigned in the past years is the sprocket assembly. Specifically, sprocket assemblies have been designed with improved sprockets to provide smoother shifting.

In view of the above, it will be apparent to those skilled in the art from this disclosure that there exists a need for an improved bicycle sprocket that provides smoother shifting. This invention addresses this need in the art as well as other needs, which will become apparent to those skilled in the art from this disclosure.

SUMMARY

Generally, the present disclosure is directed to various features of a bicycle sprocket. An object of the present invention is to provide a bicycle sprocket to facilitate smooth, reliable shifting performance.

In view of the state of the known technology and in accordance with a first aspect of the present invention, a bicycle sprocket is provided including a sprocket body and a chain engagement structure. The sprocket body has a center rotational axis, a first side surface and a second side surface. The first and second side surfaces face oppositely with respect to an axial direction of the bicycle sprocket. The first side surface is a smaller sprocket facing side of the bicycle sprocket. The chain engagement structure includes a plurality of sprocket teeth extending radially outward from an outer periphery of the sprocket body. The sprocket teeth include at least one shift assist tooth having a recessed portion recessed from the first side surface toward the second side surface. A protuberance is formed in the recessed portion.

In accordance with a second aspect of the present invention, the bicycle sprocket according to the first aspect is configured such that the protuberance is configured to incline a bicycle chain when the bicycle chain is shifted from an adjacent small sprocket toward the bicycle sprocket.

In accordance with a third aspect of the present invention, the bicycle sprocket according to the first aspect is configured such that the sprocket teeth include a plurality of shift assist teeth. Each shift assist tooth can have a recessed portion. The protuberance can be formed in each of the recessed portions.

In accordance with a fourth aspect of the present invention, the bicycle sprocket according to the first aspect is configured such that the protuberance can be disposed on an upstream side of the recessed portion with respect to a driving rotational direction of the bicycle sprocket.

In accordance with a fifth aspect of the present invention, the bicycle sprocket according to the first aspect is configured such that the protuberance can be disposed on a downstream side of the recessed portion with respect to a driving rotational direction of the bicycle sprocket.

In accordance with a sixth aspect of the present invention, the bicycle sprocket according to the first aspect is configured to be used in a multiple bicycle sprocket assembly including an additional bicycle sprocket. The additional bicycle sprocket includes a sprocket body having a center rotational axis, a first side surface and a second side surface. The first and second side surfaces face oppositely with respect to an axial direction of the bicycle sprocket. The first side surface is a smaller sprocket facing side of the bicycle sprocket. A chain engagement structure includes a plurality of sprocket teeth extending radially outward from an outer periphery of the sprocket body. The sprocket teeth include at least one shift assist tooth having a recessed portion recessed from the first side surface toward the second side surface. A protuberance is formed in the recessed portion.

In accordance with a seventh aspect of the present invention, the bicycle sprocket according to the sixth aspect is configured such that the protuberance of the additional bicycle sprocket is configured to incline a bicycle chain when the bicycle chain is shifted from an adjacent small sprocket toward the additional bicycle sprocket.

In accordance with an eighth aspect of the present invention, the bicycle sprocket according to the sixth aspect is configured such that the sprocket teeth of the additional bicycle sprocket include a plurality of shift assist teeth. Each shift assist tooth has a recessed portion. The protuberance of the additional bicycle sprocket is formed in each of the recessed portions.

In accordance with a ninth aspect of the present invention, the bicycle sprocket according to the sixth aspect is configured such that the protuberance of the additional bicycle sprocket is disposed on an upstream side of the recessed portion with respect to a. driving rotational direction of the additional bicycle sprocket.

In accordance with a tenth aspect of the present invention, the bicycle sprocket according to the sixth aspect is configured such that the protuberance of the additional bicycle sprocket is disposed on a downstream side of the recessed portion with respect to a driving rotational direction of the additional bicycle sprocket.

Also other objects, features, aspects and advantages will become apparent to those skilled in the bicycle field from the following detailed description, which, taken in conjunction with the annexed drawings, discloses illustrative embodiments.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the bicycle field from this disclosure that the following descriptions of the exemplary embodiments are provided for illustration only and not for the purpose of limiting the invention as defined by the appended claims and their equivalents.

Figure 1:
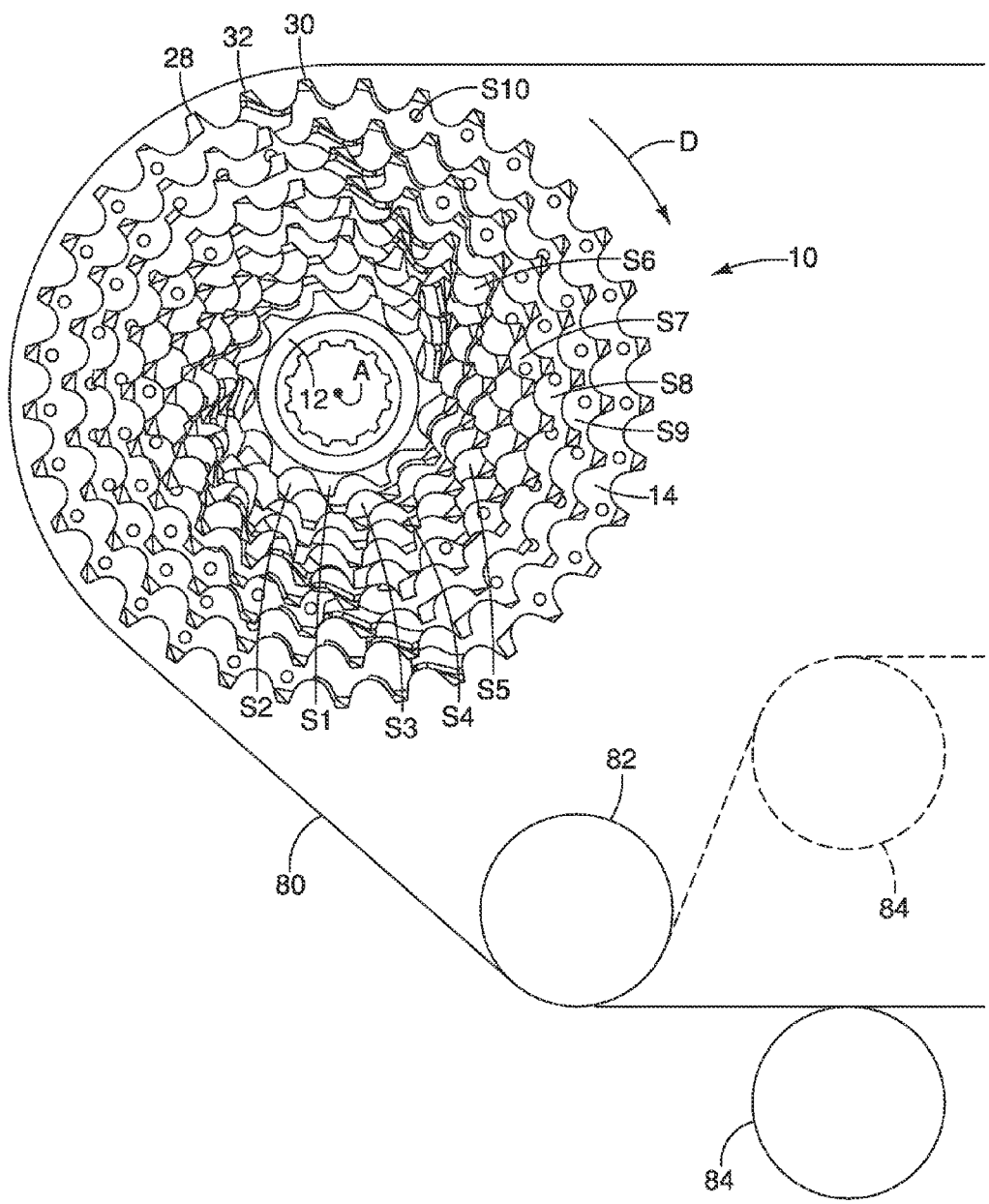
FIG. 1 is a side elevational view of a bicycle sprocket in accordance with a first exemplary embodiment of the present invention.

Referring initially to FIG. 1, a rear multi-stage sprocket assembly 10 is illustrated in accordance with a first exemplary embodiment. In the illustrated embodiment, the multi-stage sprocket assembly 10 includes a plurality of sprockets S1 to S10 and a lock ring 12. The sprockets S1 to S10 are configured to be fixedly mounted on a freewheel (not shown) of a rear hub (not shown) in a relatively conventional manner such that the sprockets S1 to S10 rotate together about a center rotational axis A. The sprockets S1 to S10 are axially spaced from each other at predetermined intervals with respect to the center rotational axis A. The sprockets S1 to S10 typically rotate together in a forward rotational direction D (e.g., in a clockwise direction as viewed in FIG. 1) when the rider is pedaling in a forward (clockwise) direction to propel the bicycle in a forward direction.

The sprockets S1 to S10 can have relatively conventional teeth or can be modified as shown to include specially configured teeth that aid in performing a shifting operation as needed and/or desired. As explained below, the sprockets S2 to S10 have specially configured teeth that aid in performing a shifting operation, such as a downshifting operation from a smaller diameter sprocket to a larger diameter sprocket. Of course, it will be apparent to those skilled in the bicycle art from this disclosure that the sprocket assembly 10 can have fewer or more sprockets. In other words, the sprocket assembly 10 can be any multi-stage sprocket assembly for a bicycle that uses a derailleur or the like and which includes at least one large sprocket and at least one small sprocket.

Figure 2:
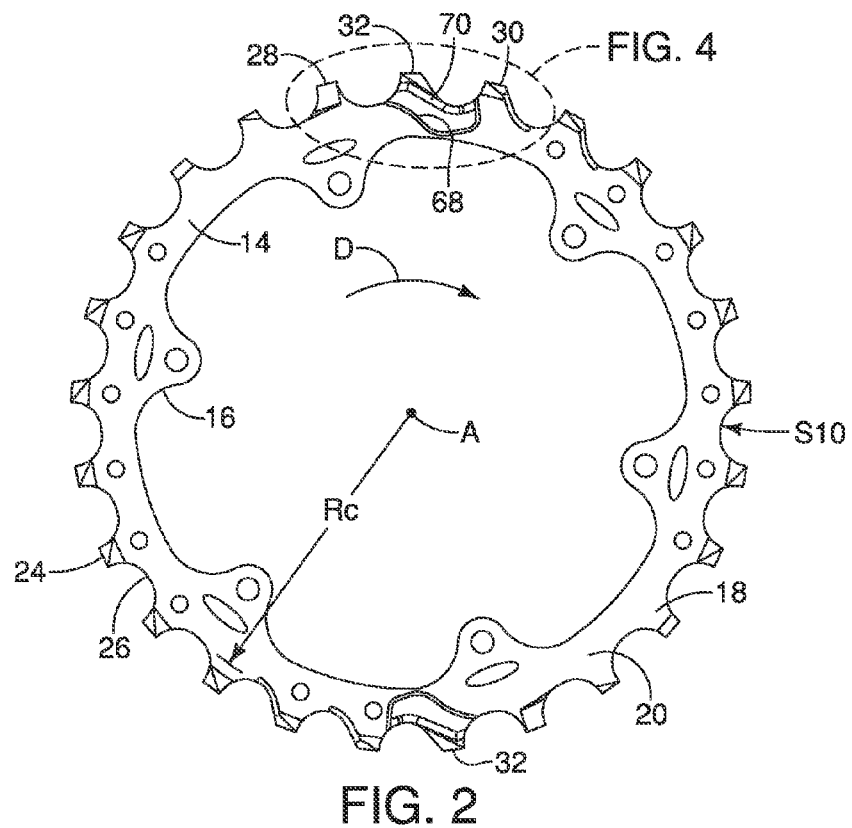
FIG. 2 is a side elevational view of a protuberance formed in a recessed portion of a first side surface of a sprocket.
Figure 3:
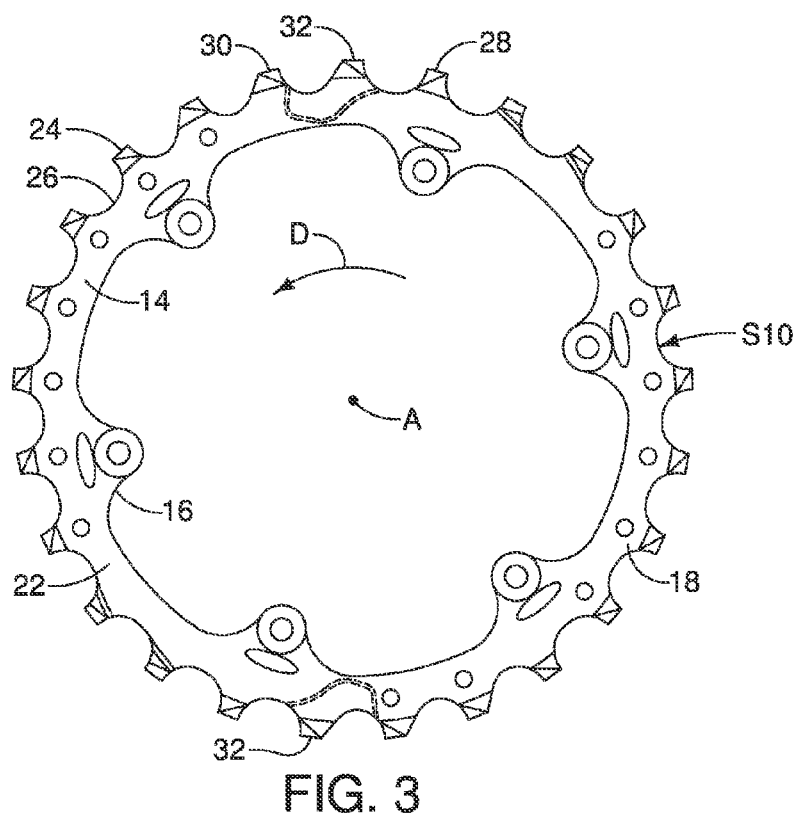
FIG. 3 is a side elevational view of a second side surface of the sprocket of FIG. 2.

As seen in FIG. 1, the sprockets S1 to S10 are hard, rigid disc shaped members formed from a suitable material such as a metallic material. In the illustrated embodiment, the sprockets S1 to S10 are each a one-piece, unitary member formed of a metallic material that is suitable for a bicycle sprocket. In the illustrated embodiment, the sprocket S10, as seen in FIGS. 2 and 3, includes the basic teeth configurations that are also used in sprockets S1 to S9. Basically, the sprockets S2 to S10 only differ in their overall diameter, number of teeth, hub mounting structure and the size/number of weight reducing openings (if any). Of course, the sprockets S1 to S10 can be different from each other with respect to other features not related to the present invention. The following description refers to sprocket S10, although it will be apparent to those skilled in the bicycle art from this disclosure that sprockets S2-S9 can be similarly configured.

Referring to FIG. 1, an upshift operation occurs when the chain is moved from a large sprocket to the next smaller sprocket, while a downshift operation occurs when the chain is shifted from a small sprocket to the next larger sprocket. The sprockets S1 to S10 are designed so that the chain can execute smooth downshifting and upshifting motions. In the illustrated embodiment, the sprockets S1 to S10 have the following teeth configuration: 11T-13T-15T-17T-19T-21T-23T-26T-30T-34T. The axial spacing between the sprockets S2 to S10 can be about 2.35 millimeters, while the axial spacing between the sprockets S1 and S2 can be about 2.26 millimeters. The sprocket body of the sprocket S1 can have a thickness of about 1.96 millimeters, while the sprocket bodies of the sprockets S2-S10 can have thicknesses of about 1.6 millimeters.

Referring now to FIGS. 2 and 3, because the parts of the sprockets S2 to S10 are essentially the same for each of the sprockets S2 to S10, with respect to the present invention, only the sprocket S10 will be illustrated in detail herein. Moreover, identical teeth of the sprockets S2 to S10 will be referred to with the same reference numerals. As seen in FIGS. 2 and 3, the sprocket S10 basically includes a sprocket body 14, a freewheel or hub mounting structure 16 and a chain engagement structure 18. In the case of sprocket S10, the sprocket body 14 is preferably integrally formed with the mounting structure 16 and the chain engagement structure 18 as a one-piece, unitary member.

The sprocket body 14 has a center rotational axis A about which the sprocket body is configured to rotate. First and second side surfaces 20 and 22, respectively, face oppositely with respect to an axial direction of the bicycle sprocket S10. The first side surface 20 faces a smaller sprocket, such as sprocket S9. The second side surface 22 faces away from the smaller sprocket, and toward a larger sprocket when a larger sprocket is disposed adjacent thereto.

The mounting structure 6 of the sprocket S10 defines the inner periphery of the sprocket body 14. Of course, it will be apparent to those skilled in the art from this disclosure that the sprocket S10 can be any suitable type of mounting structure configured to secure the sprocket S10 to a bicycle hub.

The chain engagement structure 18 is formed on the outer periphery of the sprocket body 14. The chain engagement structure 18 includes a plurality of sprocket teeth 24 with a plurality of troughs or roots 26 interposed between the teeth 24. Thus, the sprocket teeth 24 extend radially outwardly from an outer periphery of the sprocket body 14 with the troughs 26 interposed between the sprocket teeth 24. Preferably, the sprocket teeth 24 are equally spaced apart from each other. Thus, the troughs 26 are arranged in an alternating manner between the sprocket teeth 24 and equally spaced apart from each other.

The plurality of sprocket teeth 24 include at least one first engagement tooth 28, at least one auxiliary tooth 30 and at least one shift assist tooth 32. The sprocket teeth 28 shall hereinafter be referred to as first engagement teeth 28, which is the first tooth to catch a chain 80 (FIG. 1) when the chain is shifted from a smaller diameter sprocket to a larger diameter sprocket (i.e., a downshifting operation, such as from sprocket S9 to sprocket S10). The sprocket teeth 30 shall hereinafter be referred to as auxiliary teeth 30. The sprocket teeth 32 shall hereinafter be referred to as shift assist teeth 32.

Figure 5:
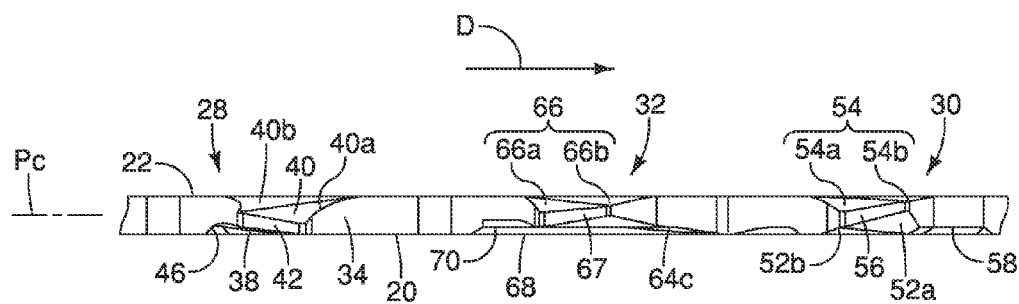
FIG. 5 is a top plan view of the sprocket of FIG. 4.

As seen in FIG. 2, the outer limit of the sprocket body 14 is defined by a root circle having a root circle radius Rc. As is well known, the root circle Rc is a hypothetical circle defined by the bottom (radial innermost point) of the troughs or roots 26 between the sprocket teeth 24. Thus, the root portion of a sprocket tooth extends radially inward from the root circle Rc towards the center rotational axis A. In this exemplary embodiment, the sprocket body 14 of the sprocket S10 has a first or small (top) sprocket facing side surface 20 (FIG. 2) and a second or large (low) sprocket facing side surface 22 (FIG. 3). The first and second side surfaces face oppositely with respect to the axial direction of the bicycle sprocket. As seen in FIG. 5, the sprocket body 14 of the sprocket S10 has a center plane Pc that bisects the sprocket body 14 between the first and second side surface 20 and 22 of the root portion of the sprocket body 14.

As seen in FIG. 1, the sprockets S1 to S10 rotate in the rotational direction D to drive a bicycle chain 80 in a drive direction. During a chain shifting process, the chain 80 is shifted from one of the sprockets S1 to S10 to the next adjacent one of the sprockets S1 to S10 by a rear derailleur moving the chain in an axial direction relative to the center rotational axis A of the sprockets S1 to S10. Bicycle chains are well known, and thus, a bicycle chain will not be illustrated in detail herein. Of course, the bicycle chain is a continuous loop that has a plurality of inner link plates and a plurality of outer link plates that are pivotally connected to each other by articulation chain pins and chain rollers. From the center of each of the chain rollers to the center of the next chain roller is about one-half inch (12.7 mm). This dimension is known as the "pitch" of the chain. The bicycle chain can be any chain that is used with a bicycle sprocket. Thus, the chain will not be described in further detail herein.

Turning now to FIGS. 2 to 6, the first engagement tooth 28 will now be discussed in more detail. The first engagement tooth 28 is also considered a first downshift tooth in that it is designed to be the first downshift tooth to catch or fully engage the chain roller during a downshifting operation. The first engagement tooth 28 has a downstream edge 34, an upstream edge 36, a top side surface 38, a low side surface 40 and a circumferential tip surface 42. The top side surface 38 and the low side surface 40 define a base portion of the first engagement tooth 28.

Figure 4:
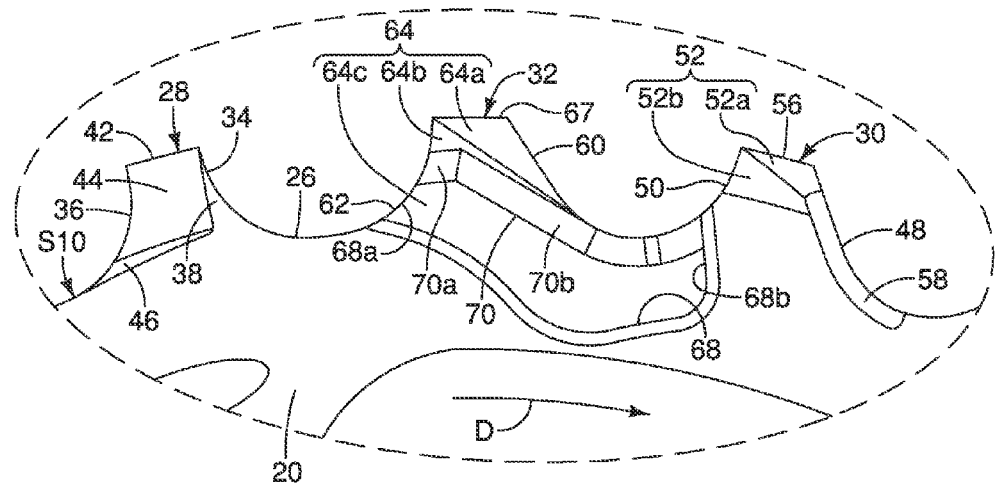
FIG. 4 is an enlarged side elevational view of the recessed portion of the sprocket of FIG. 2.

As seen in FIGS. 4 and 5, the top side surface 38 of the first engagement tooth 28 has an inclined surface 44 that circumferentially slopes in an upstream direction towards the sprocket center plane Pc from the small (top) sprocket facing side surface 20 of the sprocket S10. The inclined surface 44 is forms an acute angle with the small (top) sprocket facing side surface 20 of the sprocket S10. The base of the top side surface 38 of the first engagement tooth 28 includes a recess 46 that extends along the inclined surface 44 with its radial dimension and its axial dimension with respect to the center rotational axis A becoming larger as the recess 44 approaches the upstream edge 36 from the downstream edge 34.

As seen in FIG. 5, the low side surface 10 of the first engagement tooth 28 has a pair of inclined surfaces 40a and 40b. The inclined surface 40a circumferentially slopes in a downstream direction and radially slopes in a top sprocket side direction as the inclined surface 40a extends from the inclined surface 40b towards the downstream edge 34 and the circumferential tip surface 42. The inclined surface 40b radially slopes in a top sprocket side direction as the inclined surface 40b extends from the large (low) sprocket facing side surface 22 towards the inclined surface 40a. Thus, the inclined surface 44 and the inclined surfaces 40a and 40b result in the circumferential tip surface 42 of the first engagement tooth 28 being twisted with its downstream edge being twisted near the small (top) sprocket facing side surface 20 of the sprocket S10 and its upstream edge being disposed near the sprocket center plane Pc.

Figure 6:
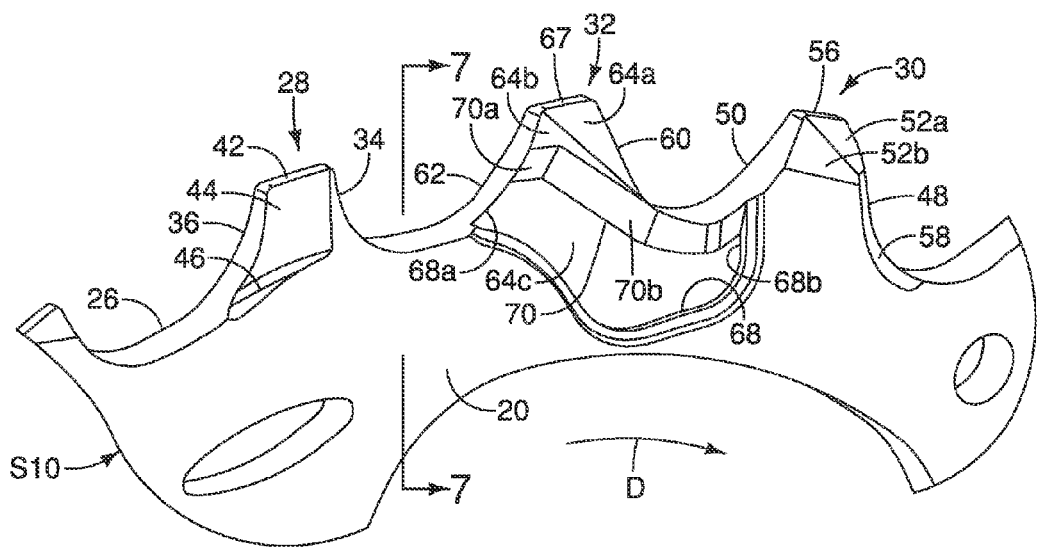
FIG. 6 is a perspective view of the recessed portion of the sprocket of FIG. 4.
Figure 7:
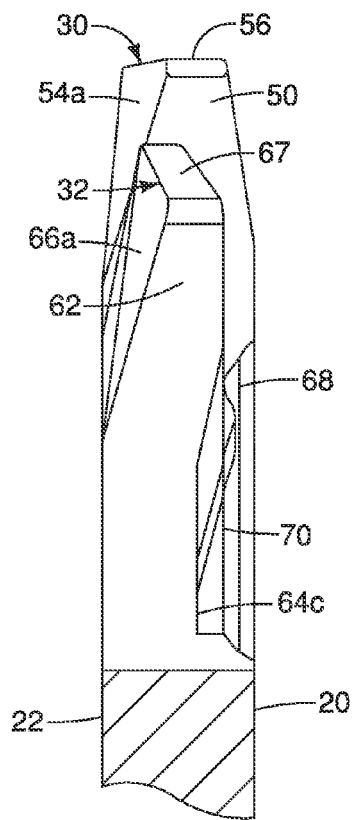
FIG. 7 is a partial downstream elevational view in partial cross section taken along line 7-7 of the sprocket of FIG. 6.

Turning now to FIGS. 4 to 6, the auxiliary teeth 30 will be briefly discussed. The auxiliary tooth 30 has a downstream edge 48, an upstream edge 50, a top side surface 52, a low side surface 54 and a circumferential tip surface 56. The top side surface 52 and the low side surface 54 define a base portion of the auxiliary teeth 30. As seen in FIGS. 4 and 5, the top side surface 52 of the auxiliary tooth 30 has a pair of inclined surfaces 52a and 52b. The inclined surface 52a circumferentially slopes in a downstream direction and radially in a low sprocket side direction as the inclined surface 52a extends from the inclined surface 52b towards the downstream edge 48 and the circumferential tip surface 56. The inclined surface 52b radially slopes in a low sprocket side direction as the inclined surface 52b extends from the small (top) sprocket facing side surface 20 towards the inclined surface 52a. The base of the auxiliary tooth 30 is provided with a recess 58 along the downstream edge 48. During an upshifting operation, a chain is guided toward a smaller sprocket due to the inclined surface 52a.

As seen in FIGS. 4 and 5, the low side surface 54 of the auxiliary tooth 30 has a pair of inclined surfaces 54a and 54b. The inclined surface 54a radially slopes in a top sprocket side direction as the inclined surface 54a extends from the inclined surface 54b towards the circumferential tip surface 56. The inclined surface 54b circumferentially slopes in an upstream direction and radially slopes in a top sprocket side direction as the inclined surface 54b extends from the large (low) sprocket facing side surface 22 of the sprocket S10 towards the inclined surface 54a. Thus, the inclined surfaces 52a, 52b, 54a and 54b result in the circumferential tip surface 56 of the auxiliary tooth 30 being offset towards the large (low) sprocket facing side surface 22 of the sprocket S10 with respect to the sprocket center plane Pc.

Turning now to FIGS. 4 to 9, the shift assist tooth 32 will now be discussed in more detail. The shift assist tooth 32 has a downstream edge 60, an upstream edge 62, a top side surface 64, a low side surface 66 and a circumferential tip surface 67. The top side surface 64 and the low side surface 66 define a base portion of the shift assist tooth 32. A recessed portion 68 extends along the base of the shift assist tooth 32 to aid in down shifting to a larger sprocket. The recessed portion 68 is recessed from the first side surface 20 toward the second side surface 22 to position a chain closer to a larger sprocket during a downshifting operation. A protuberance 70 is firmed in the recess portion 68. The protuberance 70 is provided to facilitate inclining the bicycle chain 80 when shifting from an adjacent small sprocket (such as sprocket S9) toward a larger sprocket (such as sprocket S10), as seen in FIGS. 10 to 14.

As seen in FIGS. 4 and 5, the top side surface 64 of the shift assist tooth 32 has a pair of inclined surfaces 64a and 64b and a non-inclined surface 64c. The inclined surface 64a circumferentially slopes in a downstream direction and radially slopes in a low sprocket side direction as the inclined surface 64a extends from the non-inclined surface 64c towards the downstream edge 60 and the circumferential tip surface 67. The inclined surface 64b radially slopes in a low sprocket side direction as the inclined surface 64b extends from the non-inclined surface 64c towards the circumferential tip surface 67. The non-inclined surface 64c is parallel to the sprocket center plane Pc and to the side surfaces 20 and 22 of the sprocket S10. The non-inclined surface 64c is recessed from the small (top) sprocket facing side surface 20 of the sprocket S10 towards the sprocket center plane Pc due to the recessed portion 68 in the root portion of the sprocket body 14.

As seen in FIGS. 4 and 5, the low side surface 66 of the shift assist tooth 32 has a pair of inclined surfaces 66a and 66b. The inclined surface 66a radially slopes in a top sprocket side direction as the inclined surface 66a extends from the inclined surface 66b towards the circumferential tip surface 67. The inclined surface 66b circumferentially slopes in an upstream direction and radially slopes in a top sprocket side direction as the inclined surface 66b extends from the large (low) sprocket facing side surface 22 of the sprocket S10 towards the inclined surface 66a. Thus, the inclined surfaces 6'1a, 64b, 66a and 66b result in the circumferential tip surface 67 of the shift assist tooth 32 being offset towards the large (low) sprocket facing side surface 22 of the sprocket S10 with respect to the sprocket center plane Pc.

Figure 8:
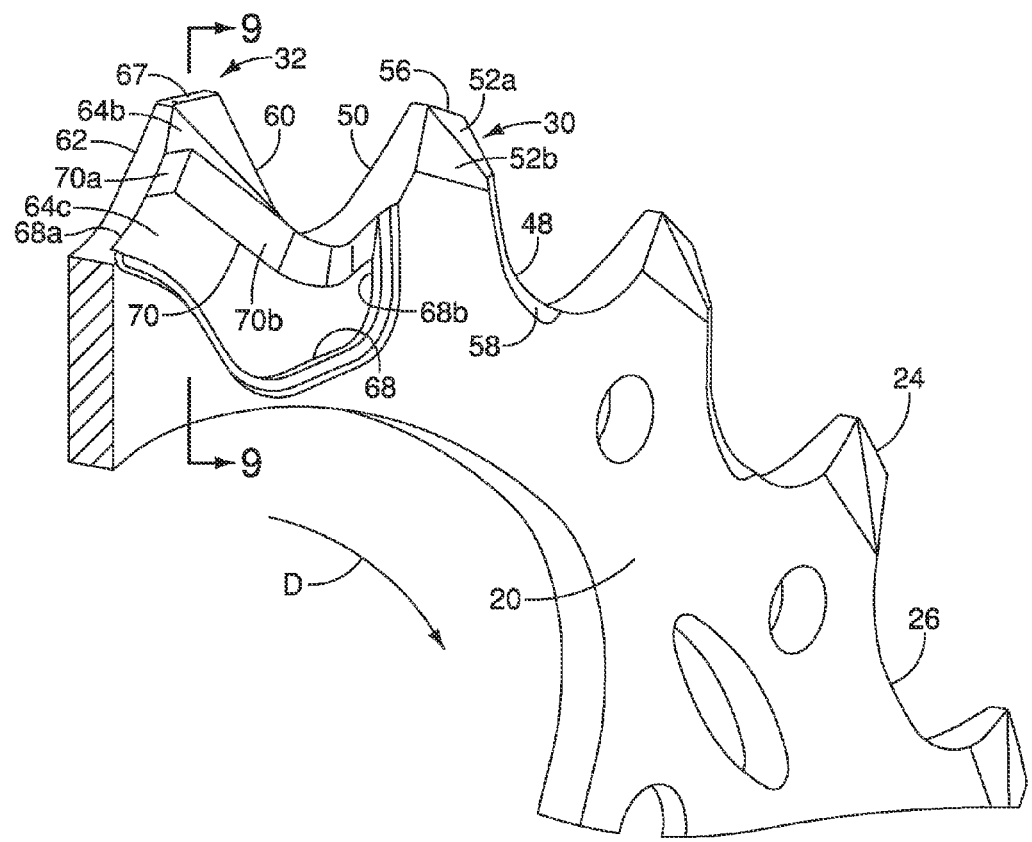
FIG. 8 is a perspective view in partial cross section of e sprocket of FIG. 2.
Figure 9:
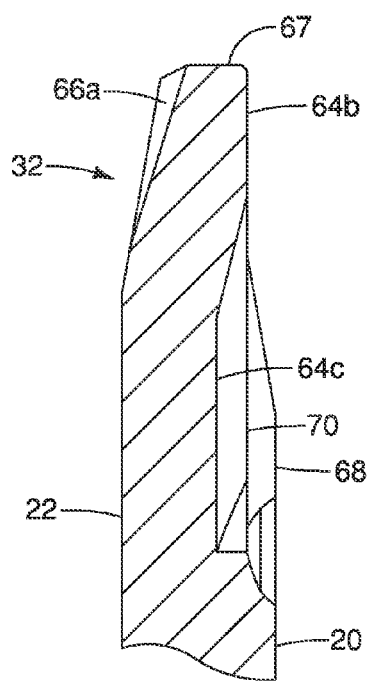
FIG. 9 is a partial downstream elevational view in cross section taken along line 9-9 of the sprocket of FIG. 8.

As seen in FIGS. 4, 6 and 8, the protuberance 70 extends outwardly from the recessed portion 68 toward the first side surface 20 in an axial direction of the bicycle sprocket S10. The protuberance 70 inclines radially toward the circumferential tip surface 67. The protuberance 70 can have any suitable shape that extends outwardly from the recessed portion 68 toward the first side surface 20 of the sprocket body 14 to facilitate inclining the bicycle chain when downshifting. For example, as shown in FIGS. 4, 6 and 8, the protuberance 70 has a first portion 70a extending outwardly toward the first side surface 20 from an upstream edge 68a of the recessed portion 68 and a second portion 70b extending outwardly toward the first side surface 20 from a downstream edge 68b of the recessed portion 68 such that the protuberance extends continuously in the axial direction from the upstream edge 68a to the downstream edge 68b of the recessed portion 68. The protuberance 70 is preferably unitarily formed with the sprocket S10, for example, by cold forging or cutting. Alternatively, the protuberance 70 can be formed in any suitable manner, including, but not limited to, riveting, adhesion or diffusion bonding.

As seen in FIGS. 1 and 2, the sprocket teeth 24 include at least one shift assist tooth 32. The sprocket teeth 24 can include a plurality of shift assist teeth 32 in which each shift assist tooth 32 has a recessed portion 68, and each recessed portion has a protuberance 70. As seen in FIG. 2, the sprocket S10 is shown having two shift assist teeth 32, although the sprocket S10 can have any suitable number of shift assist teeth. Each shift assist tooth 32 is substantially similarly configured such that each shift assist tooth 32 has a recessed portion 68, and each recessed portion has a protuberance 70.

As seen in FIGS. 1 and 10 to 12, the sprocket assembly 10 can include multiple sprockets configured similarly to sprocket S10 as described above. The multiple bicycle sprocket assembly 10 includes at least sprocket S10 and an additional sprocket, such as sprocket S9. The additional sprocket, such as sprocket S9, includes a plurality of recessed portions 68 in which each recessed portion 68 has a protuberance 70. The additional sprocket, such as sprocket S9, is configured substantially similarly to sprocket S10 such that the sprocket S9 will not be described in further detail herein.

As seen in FIG. 1, the rear derailleur includes a guide pulley 82 and a tension pulley 84 to facilitate shifting the bicycle chain 80 between sprockets. The guide pulley 82 guides the chain 80 when shifting between sprockets. The tension pulley 84 adjusts tension in the chain 80 when the chain length changes when the chain is shifted between sprockets. As shown in solid lines in FIG. 1, the tension pulley 84 is in a position in which the chain length is the longest because the chain 80 is engaging the largest sprocket S10. As shown in dashed lines in FIG. 1, the tension pulley 84 is moved to a position to accommodate slack in the chain 80 due to the chain being shifted to a smaller sprocket (sprocket S9, for example).

An upshift operation occurs when the chain 80 is moved from a large sprocket to the next smaller sprocket (such as from sprocket S10 to sprocket S9), while a downshift operation occurs when the chain is shifted from a small sprocket to the next larger sprocket (such as from sprocket S9 to sprocket S10). The sprockets S1 to S10 are designed so that the chain can execute smooth downshifting and upshifting motions.

Figure 10:
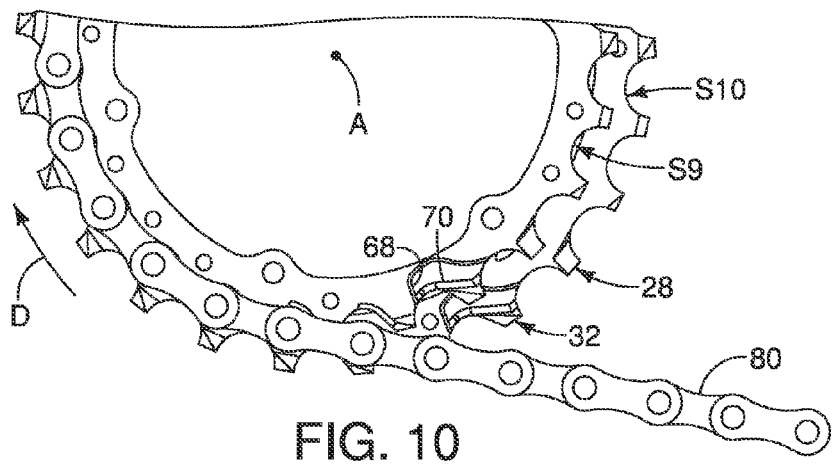
FIG. 10 is a partial side elevational view of a bicycle chain prior to shifting from an adjacent small sprocket toward the bicycle sprocket.
Figure 11:
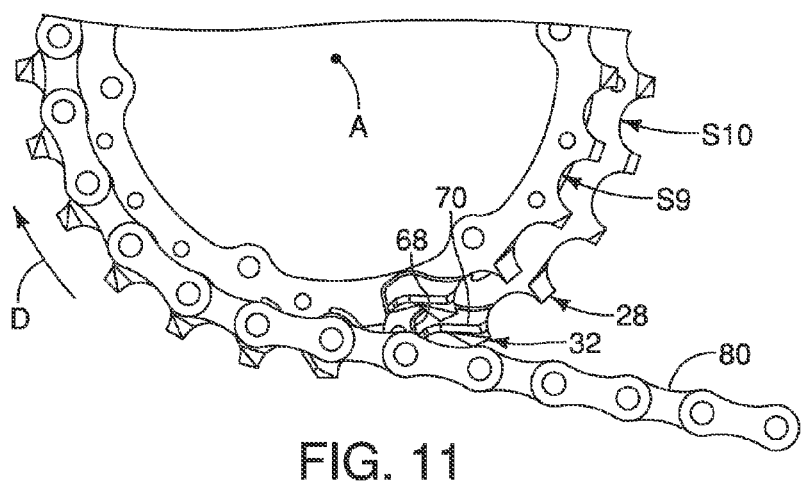
FIG. 11 is a partial side elevational view of the bicycle chain prior to contacting the protuberance of the bicycle sprocket.
Figure 12:
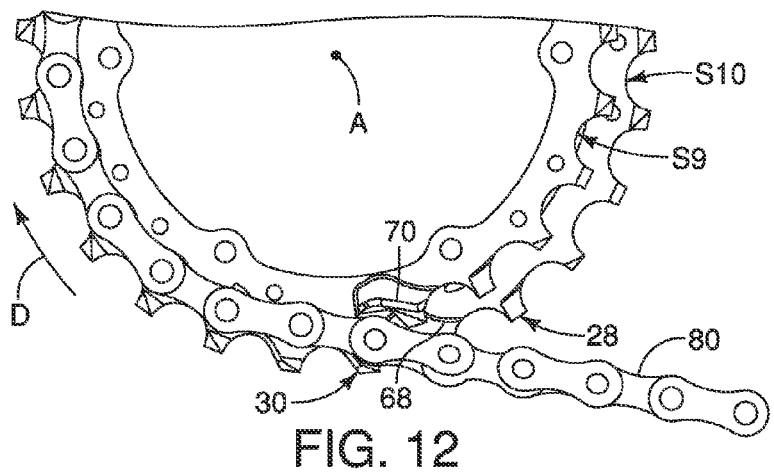
FIG. 12 is a partial side elevational view of the bicycle chain inclined by contacting the protuberance of the bicycle sprocket.
Figure 13:
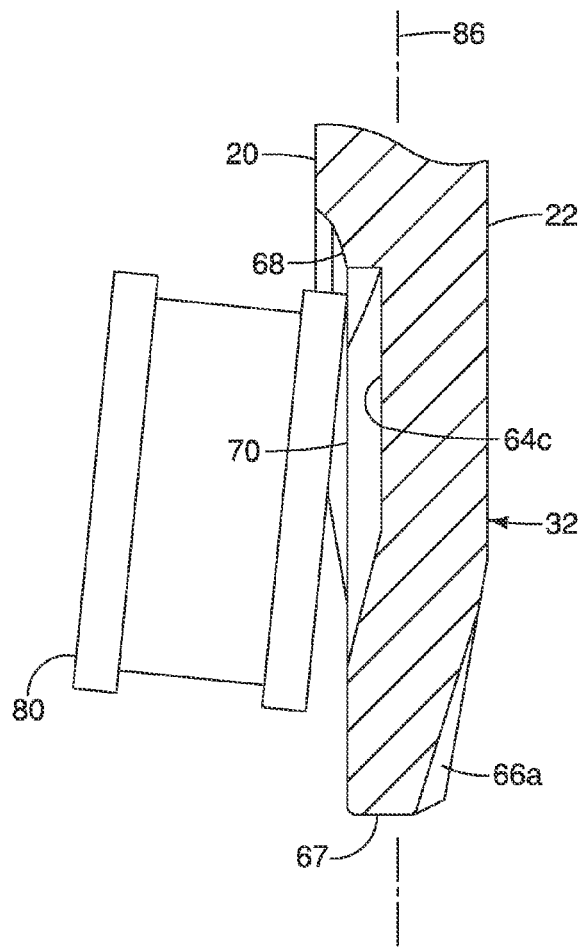
FIG. 13 is an enlarged partial side elevational view of the inclined bicycle chain prior to engaging a shift assist tooth of the bicycle sprocket.
Figure 14:
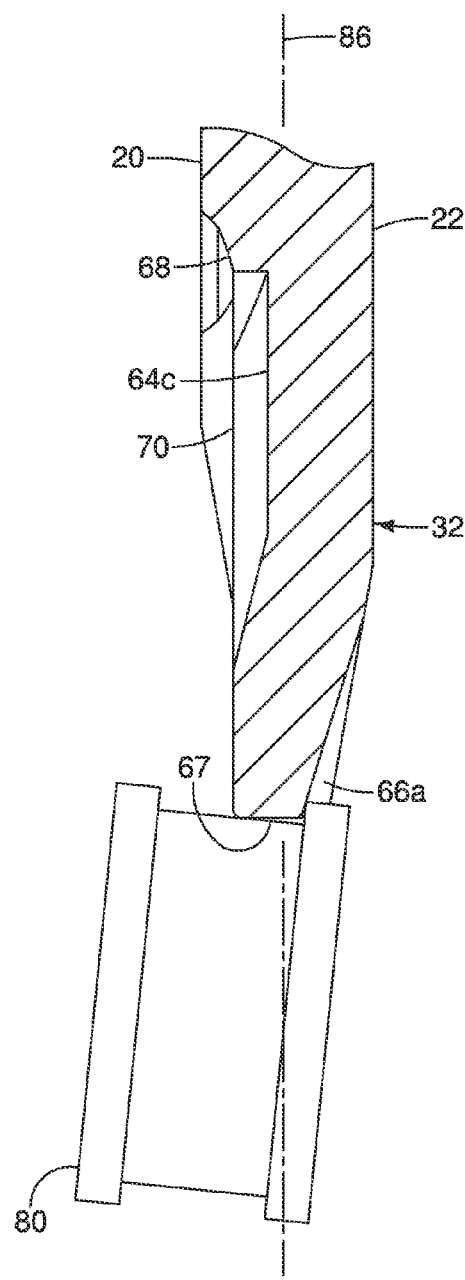
FIG. 14 is an enlarged partial side elevational view of the bicycle chain engaging the sprocket after contacting the protuberance to facilitate shifting.

As seen in FIGS. 10 to 12, a downshift operation of the chain is illustrated accordance with the first exemplary embodiment of the present invention. The chain 80 is shifted from an adjacent small sprocket, such as sprocket S9, toward the sprocket S10. As the sprocket S10 rotates in the rotational direction D and the chain 80 is shifted from sprocket S9 to sprocket S10, the chain 80 moves radially outwardly from the smaller sprocket (S9) to the adjacent larger sprocket (S10). During the shifting movement of the chain 80 from sprocket S9 to sprocket S10, the chain 80 contacts the protuberance 70 formed in the recessed portion 68 on the first side surface 20 of the sprocket S10 facing the smaller sprocket S9, as seen in FIGS. 12 and 13. The contact with the protuberance 70 causes the chain 80 to be inclined relative to a plane 86 in which the sprocket S10 rotates. The inclination of the chain 80 facilitates the chain 80 engaging teeth 24 of the sprocket S10, as seen in FIG. 14.

Figure 15:
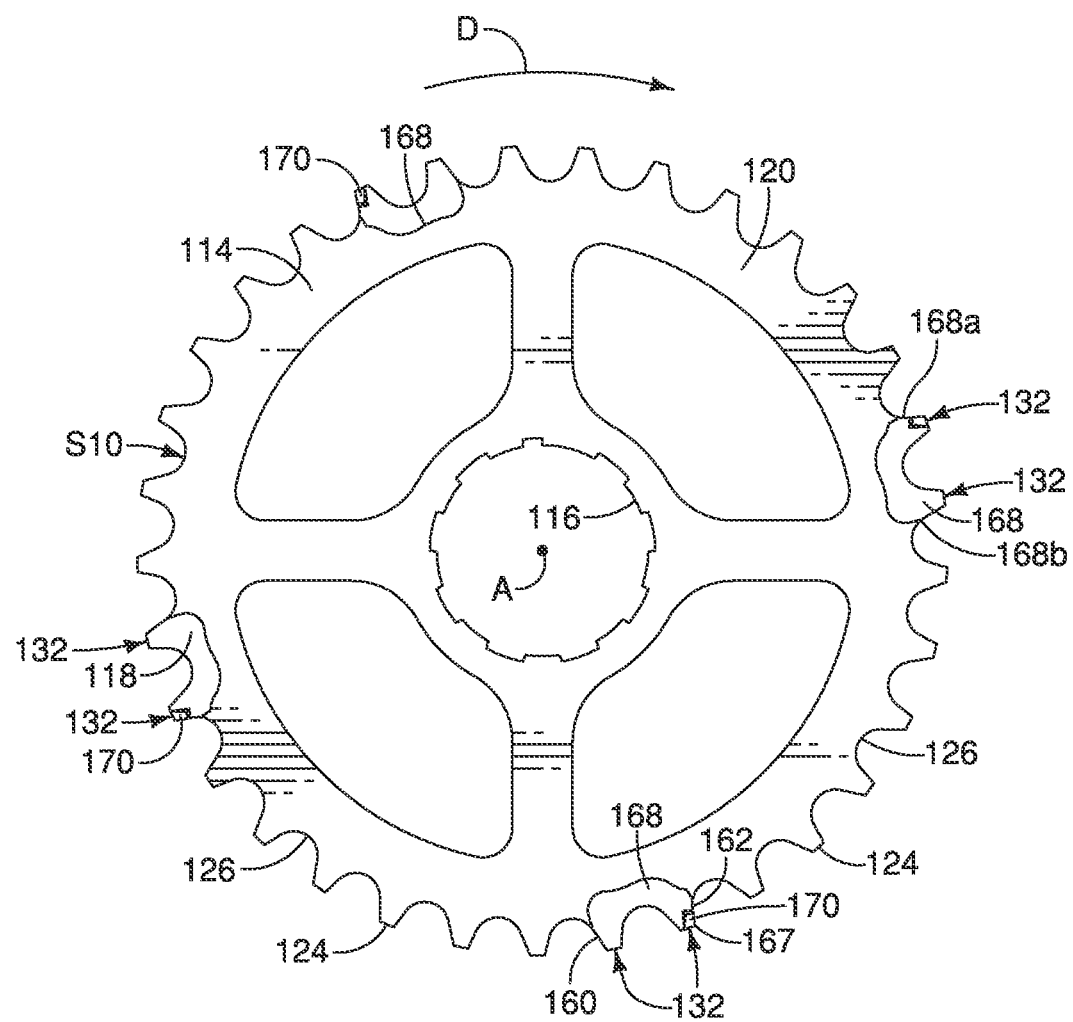
FIG. 15 is a side elevational view of a protuberance formed on an upstream side of a recessed portion of a bicycle sprocket in accordance with a second exemplary embodiment of the present invention.
Figure 16:
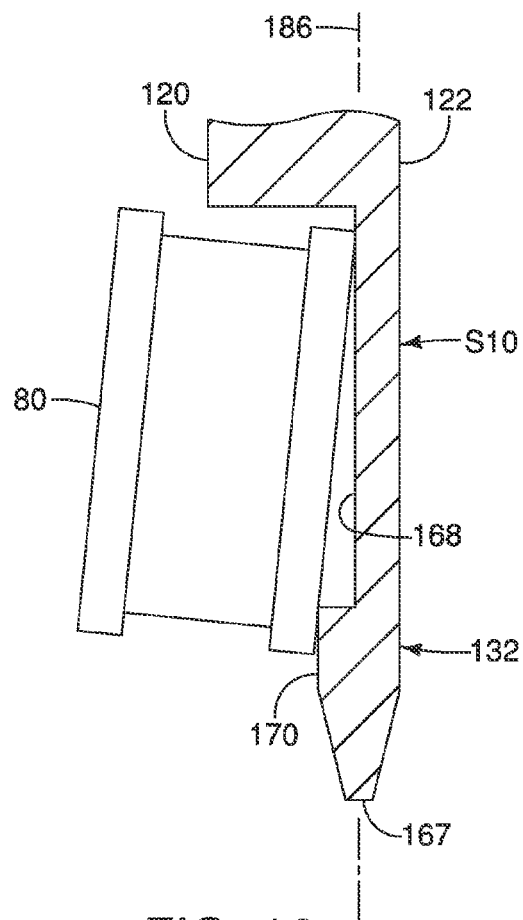
FIG. 16 is an enlarged partial side elevational view of the bicycle chain contacting the protuberance of the sprocket of FIG. 15.
Figure 17:
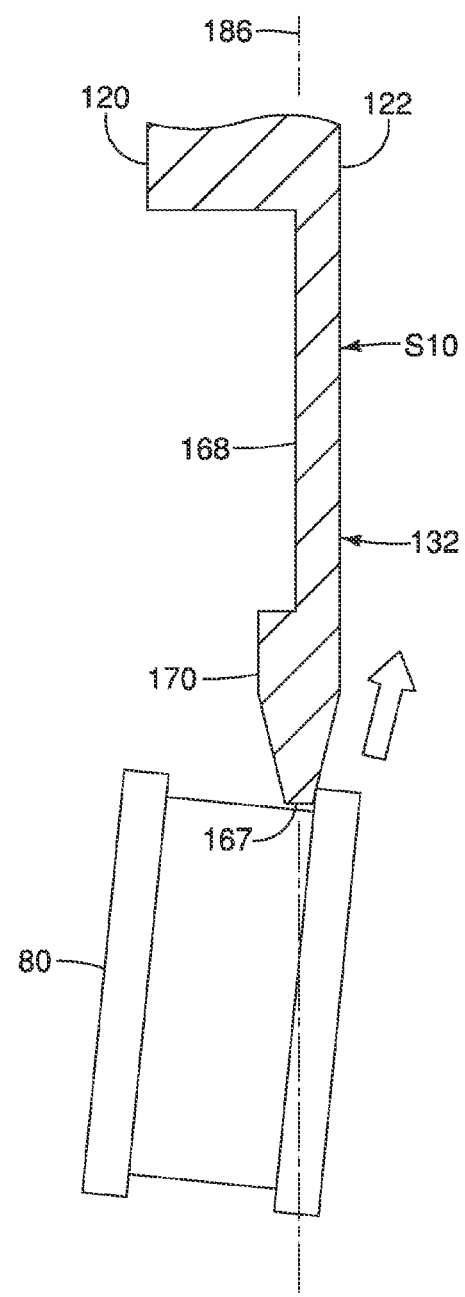
FIG. 17 is an enlarged partial side elevational view of the inclined bicycle chain engaging the sprocket after contacting the protuberance to facilitate shifting.

A second exemplary embodiment of the present invention is shown in FIGS. 15 to 17. The bicycle sprocket S10 of the second exemplary embodiment is substantially similar to the bicycle sprocket S10 of the first exemplary embodiment, except for the distinctions described below. Similar features are identified with a similar reference numeral except in the 100 series, e.g., 1xx.

The mounting structure 116 of the sprocket S10 is a splined bore that defines an inner periphery of a sprocket body 114, as seen in FIG. 15. Of course, it will be apparent to those skilled in the art from this disclosure that the sprocket S10 can have other types of mounting structures that are suitable for securing the sprocket S10 to a bicycle hub. The mounting structure 116 of the sprocket S10 preferably has a plurality of splines with one or more splines having a different shape such that the splines engage corresponding splines on a sprocket mounting sleeve of a freewheel or the like in a known manner to fix the sprocket S10 at a predetermined rotational position relative to the remaining sprockets. The sprocket mounting sleeve is, in turn, rotatably mounted around a hub axle through ball bearings and a one-way clutch in a known manner.

As seen in FIG. 15, the sprocket teeth 124 are shown as relatively conventional teeth. However, the sprocket teeth 124 can be specially configured teeth that aid in performing a shifting operation as needed and/or desired, as seen in FIGS. 1 to 3. The sprocket teeth 124 include at least one shift assist tooth 132 having a recessed portion. The sprocket teeth 124 can include a plurality of shift assist teeth 132 in which each shift assist tooth 132 has a recessed portion 168. As seen in FIG. 15, the sprocket S10 is shown having four pairs of shift assist teeth 132, with the shift assist teeth 132 being grouped into pairs of the shift assist teeth 132, although the sprocket S10 can have any suitable number of shift assist teeth. Each shift assist tooth 132 has a downstream edge 160, an upstream edge 162 and a circumferential tip surface 167. A recessed portion 168 extends radially inwardly from the circumferential tip surface 167 on the first side surface 120 to aid in downshifting to a larger sprocket. The recessed portion 168 is recessed from the first side surface 120 toward the second side surface 122 (FIGS. 16 and 17) to position a chain closer to a larger sprocket (S10, for example) during a downshifting operation from a smaller sprocket (S9, for example). As seen in FIG. 15, the recessed portion 168 extends inwardly from the circumferential tip surfaces 167 of the pair of shift assist teeth 132 such that an upstream edge 168*a* of the recessed portion 168 is adjacent the upstream edge 162 of a first tooth of the pair of shift assist teeth 132 and a downstream edge 168*b* of the recessed portion 168 is adjacent the downstream edge 160 of a second tooth of the pair of shift assist teeth 132. The recessed portion 168 can have any suitable configuration to facilitate positioning the chain 80 closer to the larger sprocket (e.g., S10) during downshifting from a smaller sprocket (e.g., S9).

A protuberance 170 is formed in a recessed portion 168, as seen in FIGS. 15 to 17. The protuberance 170 extends outwardly away from the recessed portion 168 in an axial direction of the bicycle sprocket S10. As seen in FIG. 15, a protuberance 170 is formed in each recessed portion 168 of the shift assist teeth 132. Accordingly, as seen in FIG. 15, for example, a protuberance 170 is formed in each of the recessed portions 168 on the first side surface 120 of the sprocket S10 for a total of four protuberances. The protuberance 170 is formed on an upstream side of the recessed portion 168 with respect to the driving rotational direction D of the sprocket S10. As seen in FIGS. 15 to 17, the protuberance 170 is formed adjacent the circumferential tip surface 167 and the upstream edge 162 of the shift assist tooth 132, although the protuberance can be formed at any location in the recessed portion 168. The protuberance 170 is preferably unitarily formed with the sprocket S10, for example, by cold forging or cutting. Alternatively, the protuberance 170 can be formed in any suitable manner, including, but not limited to, riveting, adhesion or diffusion bonding.

As seen in FIGS. 16 to 17, a downshift operation of the chain is illustrated in accordance with the second exemplary embodiment of the present invention. The chain 80 is shifted from an adjacent small sprocket toward the sprocket S10. As the sprocket S10 rotates in the rotational direction D and the chain 80 is shifted from the smatter sprocket to sprocket S10, the chain 80 moves radially outwardly from the smaller sprocket to the adjacent larger sprocket S10. During the shifting movement of the chain 80 to sprocket S10, the chain 80 contacts the protuberance 170 formed in the recessed portion 168 on the first side surface 120 of the sprocket S10 facing the smaller sprocket, as seen in FIG. 16. The contact with the protuberance 170 causes the chain 80 to be inclined relative to a plane 186 in which the sprocket S10 rotates. The inclination of the chain 80 facilitates the chain 80 engaging teeth 124 of the sprocket S10, as seen in FIG. 17.

Figure 18:
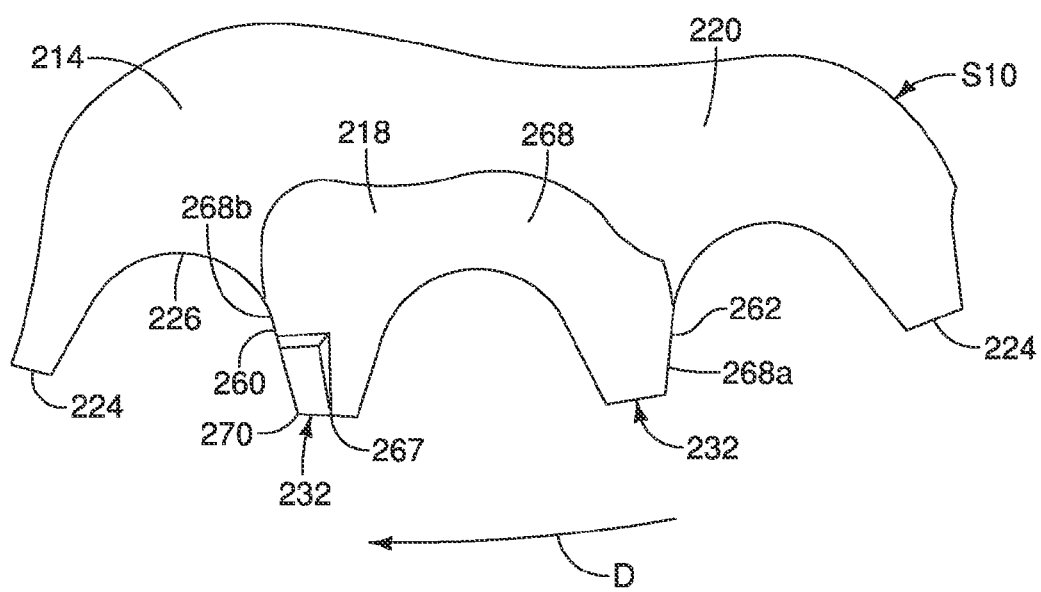
FIG. 18 a partial elevational view of a protuberance formed on a downstream side of a recessed portion of a bicycle sprocket in accordance with a third exemplary embodiment of the present invention.

A third exemplary embodiment of the present invention is shown in FIG. 18. The bicycle sprocket S10 of the third exemplary embodiment is substantially similar to the bicycle sprocket S10 of the first and second exemplary embodiments, except for the distinctions described below. Similar features are identified with a similar reference numeral except in the 200 series, e.g., 2xx.

As seen in FIG. 18, the sprocket teeth 224 are shown as relatively conventional teeth. However, the sprocket teeth 224 can be specially configured teeth that aid in performing a shifting operation as needed and/or desired, as seen in FIGS. 1 to 3. The sprocket teeth 224 include at least one shift assist tooth 232 having a recessed portion. The sprocket teeth 224 can include a plurality of shift assist teeth 232 in which each shift assist tooth 232 has a recessed portion 268. The sprocket teeth 224 are configured substantially similar to the sprocket teeth 124 as seen in FIG. 15. The shift assist teeth 232 are grouped into pairs of the shift assist teeth 232, although the sprocket S10 can have any suitable number of shift assist teeth. Each shift assist tooth 232 has a downstream edge 260, an upstream edge 262 and a circumferential tip surface 267. A recessed portion 268 extends radially inwardly from the circumferential tip surface 267 on a first side surface 220 to aid in downshifting to a larger sprocket. The recessed portion 268 is recessed from the first side surface 220 toward an opposing second side surface (such as second side surface 122 of FIGS. 16 and 17) to position a chain closer to a larger sprocket (S10, for example) during a downshifting operation from a smaller sprocket (S9, for example). As seen in FIG. 18, the recessed portion 268 extends inwardly from the circumferential tip surfaces 267 of the pair of shift assist teeth 232 such that an upstream edge 268*a* of the recessed portion 268 is adjacent the upstream edge 262 of a first tooth of the pair of shift assist teeth 232 and a downstream edge 268*b* of the recessed portion 268 is adjacent the downstream edge 260 of a second tooth of the pair of shift assist teeth 232. The recessed portion 268 can have any suitable configuration to facilitate positioning the chain 80 closer to the larger sprocket (e.g., S10) during downshifting from a smaller sprocket (e.g., S9).

A protuberance 270 is firmed in a recessed portion 268, as seen in FIG. 18. The protuberance 270 extends outwardly away from the recessed portion 268 in an axial direction of the bicycle sprocket S10. The protuberance 270 is formed on the downstream side 268*b* of the recessed portion 268 with respect to the driving rotational direction D of the sprocket S10. As seen in FIG. 18, the protuberance 270 is formed adjacent a circumferential tip surface 267 and the downstream edge 260 of the shift assist tooth 232, although the protuberance can be formed at any suitable location in the recessed portion 268. The protuberance 270 is preferably unitarily formed with the sprocket S10, for example, by cold forging or cutting. Alternatively, the protuberance 270 can be formed in any suitable manner, including, but not limited to, riveting, adhesion or diffusion bonding.

To better understand the above description of the sprocket assembly 10, some of the terms will now be further explained for the sake of clarity. As used herein, the term "forward," as well as similar directional terms, refer to those directions of the sprocket assembly 10 with respect to a bicycle in its normal riding position on a horizontal surface. Accordingly, directional terms, as utilized to describe the sprocket assembly 10 in the claims, should be interpreted relative to a bicycle in its normal riding position on a horizontal surface. Also, the term "downshift" and "upshift" as used herein in reference to the rear sprocket assembly 10 should be interpreted to mean a shift from smatter to larger sprocket and from larger to smaller sprocket, respectively. As used herein, the term "smatter sprocket" refers to a sprocket having a smaller diameter with respect to the claimed sprocket and the term "larger sprocket" refers to a sprocket having a larger diameter with respect to the sprocket in question. As used herein, the term "smaller sprocket facing side surface" refers to a side surface of the sprocket in question that faces a sprocket having a smaller diameter with respect to the sprocket in question. The absence of the use of the modifying term "at least one" before another term should not be construed to preclude additional ones of the modified terms. As used herein, the term "comprising" and its derivatives are intended to be open ended terms that specify the presence of the stated features, elements, components, groups, integers, and/or steps. This concept also applies to words of similar meaning, for example, the terms "have", "include" and their derivatives.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A bicycle sprocket comprising:
a sprocket body having a center rotational axis, a first side surface and a second side surface, the first and second side surfaces facing oppositely with respect to an axial direction of the bicycle sprocket, the first side surface being a smaller sprocket facing side of the bicycle sprocket; and
a chain engagement structure including a plurality of sprocket teeth extending radially outward from an outer periphery of the sprocket body,
the sprocket teeth including at least one shift assist tooth having a recessed portion recessed from the first side surface toward the second side surface, the recessed portion being at a position on the shift assist tooth that is above a root circle and extends from a downstream edge of the at least one shift tooth to an upstream edge of the at least one shift tooth; and
a protuberance formed in the recessed portion.

2. The bicycle sprocket according to claim 1, wherein the protuberance is configured to incline a bicycle chain when the bicycle chain is shifted from an adjacent small sprocket toward the bicycle sprocket.

3. The bicycle sprocket according to claim 1, wherein the sprocket teeth include a plurality of shift assist teeth, each shift assist tooth having a recessed portion; and the protuberance is formed in each of the recessed portions.

4. The bicycle sprocket according to claim 1, wherein the protuberance is disposed on an upstream side of the recessed portion with respect to a driving rotational direction of the bicycle sprocket.

5. The bicycle sprocket according to claim 1, wherein the protuberance is disposed on a downstream side of the recessed portion with respect to a driving rotational direction of the bicycle sprocket.

6. A multiple bicycle sprocket assembly including the bicycle sprocket according to claim 1, further comprising an additional bicycle sprocket, the additional bicycle sprocket including
a sprocket body having a center rotational axis, a first side surface and a second side surface, the first and second side surfaces facing oppositely with respect to an axial direction of the bicycle sprocket, the first side surface being a smaller sprocket facing side of the bicycle sprocket; and
a chain engagement structure including a plurality of sprocket teeth extending radially outward from an outer periphery of the sprocket body,
the sprocket teeth including at least one shift assist tooth having a recessed portion recessed from the first side surface toward the second side surface; and
a protuberance formed in the recessed portion.

7. The multiple bicycle sprocket assembly according to claim 6, wherein
the protuberance of the additional bicycle sprocket is configured to incline a bicycle chain when the bicycle chain is shifted from an adjacent small sprocket toward the additional bicycle sprocket.

8. The multiple bicycle sprocket assembly according to claim 6, wherein
the sprocket teeth of the additional bicycle sprocket include a plurality of shift assist teeth, each shift assist tooth having a recessed portion; and
the protuberance of the additional bicycle sprocket is formed in each of the recessed portions.

9. The multiple bicycle sprocket assembly according to claim 6, wherein
the protuberance of the additional bicycle sprocket is disposed on an upstream side of the recessed portion with respect to a driving rotational direction of the additional bicycle sprocket.

10. The multiple bicycle sprocket assembly according to claim 6, wherein
the protuberance of the additional bicycle sprocket is disposed on a downstream side of the recessed portion with respect to a driving rotational direction of the additional bicycle sprocket.

11. The bicycle sprocket according to claim 1, wherein the recessed portion extends along a base portion of the shift assist tooth, the base portion being defined as between a top side surface and a low side surface of the shift assist tooth.

12. The bicycle sprocket according to claim 1, wherein the protuberance inclines radially toward a circumferential tip surface of the shift assist tooth.

13. A bicycle sprocket comprising:
a sprocket body having a center rotational axis, a first side surface and a second side surface, the first and second side surfaces facing oppositely with respect to an axial direction of the bicycle sprocket, the first side surface being a smaller sprocket facing side of the bicycle sprocket; and
a chain engagement structure including a plurality of sprocket teeth extending radially outward from an outer periphery of the sprocket body,
the sprocket teeth including at least one shift assist tooth having a recessed portion recessed from the first side surface toward the second side surface; and
a protuberance formed in the recessed portion, the protuberance having a first portion extending outwardly toward a first side surface of the sprocket body from an upstream edge of the recessed portion, the protuberance having a second portion extending outwardly toward the first side surface from a downstream edge of the recessed portion such that the protuberance extends continuously in the axial direction from the upstream edge to the downstream edge of the recessed portion.

14. The bicycle sprocket according to claim 1, wherein the shift assist tooth is disposed circumferentially between a first engagement tooth and an auxiliary tooth along the sprocket body.

15. A bicycle sprocket comprising:
a sprocket body having a center rotational axis, a first side surface and a second side surface, the first and second side surfaces facing oppositely with respect to an axial direction of the bicycle sprocket, the first side surface being a smaller sprocket facing side of the bicycle sprocket; and
a chain engagement structure including a plurality of sprocket teeth extending radially outward from an outer periphery of the sprocket body,
the sprocket teeth including at least one shift assist tooth having a recessed portion recessed from the first side surface toward the second side surface, the recessed portion being at a position on the shift assist tooth that is above a root circle; and
a protuberance formed in the recessed portion, the protuberance inclining radially toward a circumferential tip surface of the shift assist tooth.

* * * * *